United States Patent
Guo

(10) Patent No.: US 12,432,159 B2
(45) Date of Patent: Sep. 30, 2025

(54) DETERMINISTIC TRAFFIC TRANSMISSION METHOD AND DEVICE

(71) Applicant: NEW H3C TECHNOLOGIES CO., LTD., Zhejiang (CN)

(72) Inventor: Daorong Guo, Beijing (CN)

(73) Assignee: NEW H3C TECHNOLOGIES CO., LTD., Zhejiang (CN)

(*) Notice: Subject to any disclaimer, the term of this patent is extended or adjusted under 35 U.S.C. 154(b) by 0 days.

(21) Appl. No.: 18/568,346

(22) PCT Filed: Dec. 29, 2021

(86) PCT No.: PCT/CN2021/142636
§ 371 (c)(1),
(2) Date: Dec. 8, 2023

(87) PCT Pub. No.: WO2023/123103
PCT Pub. Date: Jul. 6, 2023

(65) Prior Publication Data
US 2024/0275735 A1 Aug. 15, 2024

(51) Int. Cl.
*H04L 47/62* (2022.01)
*H04L 43/50* (2022.01)
*H04L 47/283* (2022.01)

(52) U.S. Cl.
CPC .......... *H04L 47/6235* (2013.01); *H04L 43/50* (2013.01); *H04L 47/283* (2013.01)

(58) Field of Classification Search
CPC ....... H04L 47/10; H04L 47/28; H04L 47/283; H04L 47/50; H04L 49/00; H04L 47/70;
(Continued)

(56) References Cited

U.S. PATENT DOCUMENTS

2019/0363976 A1* 11/2019 Thubert ................ H04L 45/306
2020/0304429 A1 9/2020 Marcé et al.
(Continued)

FOREIGN PATENT DOCUMENTS

CN 112887226 A 6/2021
CN 113068263 A 7/2021
(Continued)

OTHER PUBLICATIONS

ISA State Intellectual Property Office of the People's Republic of China, International Search Report Issued in Application No. PCT/CN2021/142636, Sep. 28, 2022, WIPO, 4 pages.
M. Chen etc."Segment Routing (SR) Based Bounded Latency draft-chen-detnet-sr-based-bounded-latency-01" "Network Working Group Internet—Draft Intended status: Informational Expires: Nov. 8, 2019" 24 pages.
(Continued)

*Primary Examiner* — Rachel J Hackenberg
(74) *Attorney, Agent, or Firm* — GREENBLUM & BERNSTEIN, P.L.C.

(57) ABSTRACT

A Deterministic Traffic (DT) transmission method and device is provided. The method includes: in a case where it is determined that a received packet belongs to a DT, and the packet does not carry Cycle Specified Queuing and Forwarding (CSQF) domain schedule information, determining a target time slot number corresponding to an arrival time of the packet; according to the target time slot number, querying a time slot schedule cycle mapping table at an egress interface for the packet, and determining a target cycle schedule queue corresponding to the target time slot number, where the time slot schedule cycle mapping table is determined based on intra-node jitter at the network node, and is used to record a mapping relationship between a time slot number and a cycle schedule queue number; scheduling the packet to the target cycle schedule queue at the egress interface for the packet.

15 Claims, 6 Drawing Sheets

(58) Field of Classification Search
CPC ... H04L 49/9021; H04L 43/50; H04L 47/622; H04L 47/6235; H04L 47/62; H04L 47/58; H04L 47/56; H04L 47/54; H04L 47/52; H04L 47/6295; H04L 47/625
See application file for complete search history.

(56) References Cited

U.S. PATENT DOCUMENTS

| | | | |
|---|---|---|---|
| 2020/0367114 A1 | 11/2020 | Li et al. | |
| 2022/0150159 A1* | 5/2022 | Medagliani | H04L 41/0894 |
| 2024/0048502 A1* | 2/2024 | Zhu | H04L 47/568 |
| 2025/0055778 A1* | 2/2025 | Han | H04L 43/0852 |

FOREIGN PATENT DOCUMENTS

| | | |
|---|---|---|
| CN | 113316191 A | 8/2021 |
| CN | 113498106 A | 10/2021 |
| CN | 113711572 A | 11/2021 |
| WO | 2019149063 A1 | 8/2019 |
| WO | 2023123105 A1 | 7/2023 |

OTHER PUBLICATIONS

Japanese Patent Office, Office Action (Notice of Reasons for Refusal) issued in Application No. 2023-574856, dated Nov. 26, 2024.

European Patent Office, Extended European Search Report Issued in Application No. 21969471.8, Jul. 8, 2024, Germany, 11 pages.

Hotescu Oana et al: "Scheduling Rate Constrained traffic in End Systems of Time-Aware Networks", XP034032601, 2021 26th IEEE International Conference on Emerging Technologies and Factory Automation(ETFA), IEEE, Sep. 7, 2021, 8 pages.

Finn Huawei Technologies Co Ltd, "DetNet Bounded Latency draft-finn-detnet-bounded-latency-03", XP015131749, Mar. 11, 2019, 32 pages.

Qiang L et al:"Large-Scale Deterministic Network draft-qiang-detnet-large-scale-detnet-02", XP015128759, Standardworkingdraft, Internet Society (ISOC) 4, Rue Des Falaises CH-1205 Geneva, Switzerl, No. 2, Sep. 27, 2018, 15 pages.

ISA State Intellectual Property Office of the People's Republic of China, Written Opinion of the International Searching Authority Issued in Application No. PCT/CN2021/142636, Sep. 28, 2022, WIPO, 6 pages.

\* cited by examiner

DETERMINISTIC TRAFFIC TRANSMISSION METHOD AND DEVICE

CROSS REFERENCE TO RELATED APPLICATIONS

This application is a National Stage of International Application No. PCT/CN2021/142636, filed on Dec. 29, 2021, the disclosure of which is incorporated herein by reference in its entirety for all purposes.

TECHNICAL FIELD

The present disclosure relates to network communication technology, and in particular, to a Deterministic Traffic (DT) transmission method and device.

BACKGROUND

Deterministic Network (DetNet for short) can provide deterministic service functions for carried services in a network domain. These deterministic service functions may include latency, a packet loss rate, etc. Taking DetNet implemented based on Local Area Network (LAN), i.e., Time Sensitive Network (TSN), as an example, in TSN, Cyclic Queuing and Forwarding (CQF) is used to ensure determination of transmission latency on an entire forwarding path at a forwarding layer, etc.

In order to implement deterministic transmission in Wide Area Network (WAN), Cycle Specified Queuing and Forwarding (CSQF) implemented based on segment routing is put forward based on CQF in this industry.

There is a global controller in the CSQF solution. The controller collects information on each node, including a sending capability, an interface, a number of cycles, maximum intra-node jitter, etc. An application applies to the controller for a deterministic transmission request. The controller, after calculation, finds that there are enough transmission resources, thereby allocating a transmission path for the application while sending information on the path to a network node of the application. The network node, after receiving a packet that is to be forwarded, adds information on each node on the path to the packet, including a node identifier of the node on the path, a sending interface of the node, and a specified sending cycle at the node. After data arrives at a node, corresponding interface and cycle information are picked at a forwarding layer of the node, and the packet is stored in a queue mapped by the cycle. With regard to respective queues based on CSQF, the node sends one queue per cycle in rounds according to certain cycle circulation.

For convenience of description, a service flow having deterministic service requirements such as bounded latency, a packet loss rate, etc. transmitted in DetNet is called a DT. Other service flows different from the DT can be called best-effort traffics according to a best-effort forwarding method in combination with existing forwarding devices such as software forwarding devices, or hardware forwarding devices implemented based on a switch chip or a Network Processor (NP).

SUMMARY

In the present disclosure, there is provided a Deterministic Traffic (DT) transmission method and device, so as to absorb intra-node jitter during scheduling of a DT.

In an embodiment of the present disclosure, there is provided a DT transmission method. The method is applied to a network node, and includes:

in a case where it is determined that a received packet belongs to a DT, and the packet does not carry Cycle Specified Queuing and Forwarding CSQF domain schedule information, determining a target time slot number corresponding to an arrival time of the packet;

according to the target time slot number, querying a time slot schedule cycle mapping table at an egress interface for the packet, and determining a target cycle schedule queue corresponding to the target time slot number, where the time slot schedule cycle mapping table is determined based on intra-node jitter at the network node, and is used to record a mapping relationship between a time slot number and a cycle schedule queue number; and scheduling the packet to the target cycle schedule queue at the egress interface for the packet.

In an embodiment of the present disclosure, there is provided an electronic device. The electronic device includes: a processor and a machine readable storage medium, where machine executable instructions that can be executed by the processor are stored in the machine readable storage medium; and the processor is configured to execute the machine executable instructions to implement the steps in the method as disclosed above.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
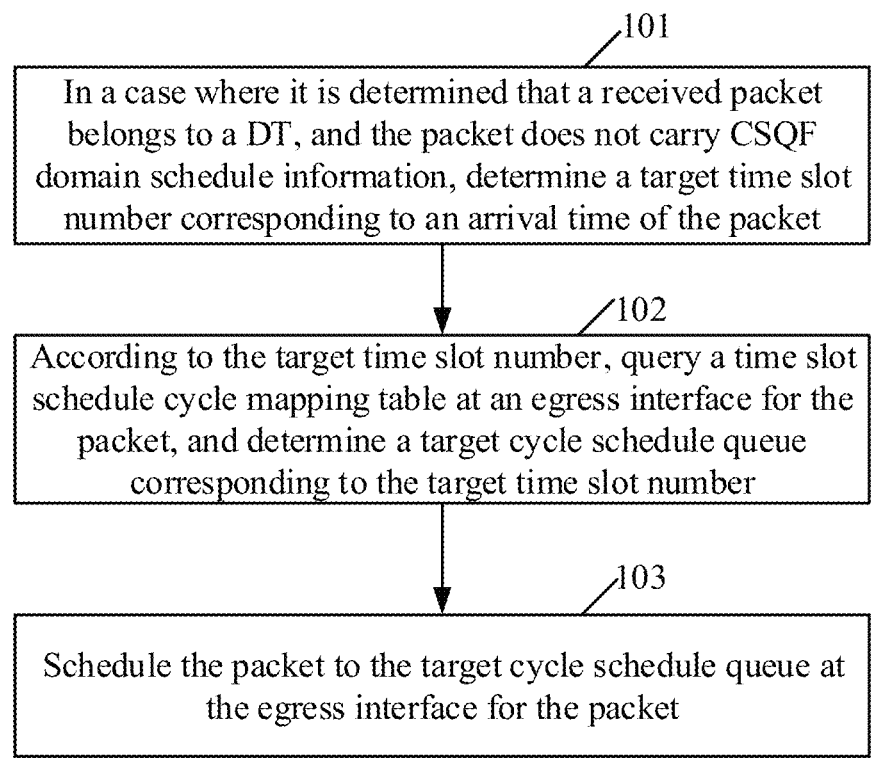
FIG. 1 is a flowchart illustrating a DT transmission method according to an embodiment of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context.

In order to enable those skilled in the art to better understand the technical solutions provided by the embodiments of the present disclosure, and make objects, features and advantages of the embodiments of the present disclosure more apparent, the technical solutions provided by the embodiments of the present disclosure will be described below with reference to the accompanying drawings.

A DT transmission method according to an embodiment of the present disclosure will be described below with reference to the accompanying drawings.

FIG. 1 is a flowchart illustrating a DT transmission method according to an embodiment of the present disclosure. This method is applied to a network node. A specific structural form of the network node is not particularly limited in the embodiments of the present disclosure. For example, the network node may be a mid-and-low-end router, or a high-end router that has high performance requirements and supports more CPU cores, and a high-end, core router based on NP forwarding, which are not particularly limited in the embodiments. Therefore, the embodiments of the present disclosure are allowed to have wide applicability and expansibility.

As shown in FIG. 1, the method may include the following steps:

At step 101, in a case where it is determined that a received packet belongs to a DT, and the packet does not carry CSQF domain schedule information, a target time slot number corresponding to an arrival time of the packet is determined.

In this embodiment, a packet that belongs to a DT will carry Deterministic Property (DetProperty).

In some examples, DetProperty is not fixed, and is not particularly specified in current norm, but can be set in a coordinated way according to actual needs. For example, a field value of Differentiated Services Code Point (DSCP) or the like is set to characterize DetProperty. DetProperty is not particularly limited in the embodiments. However, once DetProperty is set and applied to step 101, it can be identified whether a current packet carries DetProperty, and if the current packet carries DetProperty, it is identified that the current packet belongs to a DT.

In this embodiment, in a case where it is determined that a packet belongs to a DT, depending on whether the packet carries CSQF domain schedule information, it can be determined whether a node serves as an edge node in a CSQF domain.

In some examples, CSQF domain schedule information may include information indicating a cycle schedule queue at an egress interface for a packet to which the packet is to be scheduled.

In this embodiment, in a case where it is determined that a received packet belongs to a DT, and the packet does not carry CSQF domain schedule information, it can be determined that a node serves as an edge node in a CSQF domain.

In this embodiment, considering that, in a conventional CSQF solution, in order to enable jitter of end-to-end transmission of data in a DT to be within 2 schedule cycles (which can be recorded as 2T), a DT from a specific user is forwarded at a specified cycle at a specific node, but different services have different packet sending cycles, for example, a cycle of 150 us is adopted in Internet of Vehicles (IoV), and a cycle of 250 us is adopted in industrial control, in a case where a cycle width of a cyclical DT is not an integral multiple of a large circulation of schedule cycles, scheduling a DT in this manner will incur extensive jitter.

Figure 2:
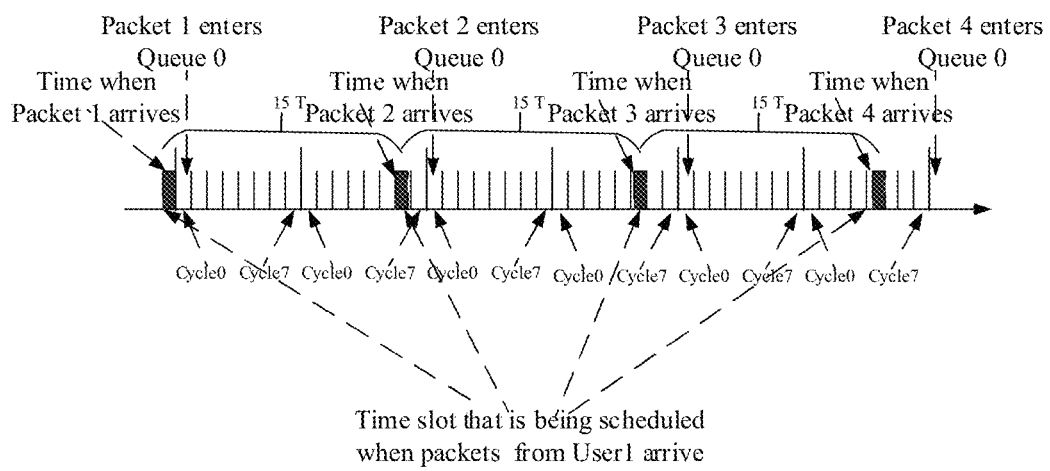
FIG. 2 is a schematic diagram illustrating arrival times of packets from User 1 and cycles of entering queues.
Figure 3:
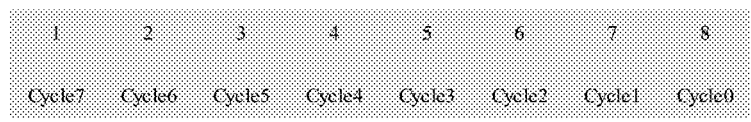
FIG. 3 is a schematic diagram illustrating cycle queues that are being scheduled when packets from User 1 arrive.

For example, it is assumed that User 1 sends a packet at a cycle of 150 us, forwarding nodes are divided according to time slices of 8 cycles (Cycles 0~7) with a duration of T (which is 10 us) for cycle schedule forwarding to correspondingly implement 8 cycle schedule Queues 0~7. According to implementation of CSQF, a specific user performs forwarding at a specified cycle at a specific node. As shown in FIG. 2, it is assumed that User 1 forwards a packet fixedly at Cycle 0 at an edge node in a CSQF domain, that is, the packet enters Queue 0. At the same time, it is assumed that when Packet 1 arrives, a queue at Cycle 7 in a previous round of large circulation is being scheduled. Packet 1 enters Queue 0 just right, that is, when Packet 1 arrives, a queue corresponding to cycle7 in the previous round is being scheduled, and after one cycle, Queue 0 will be scheduled; after 150 us, Packet 2 from User 1 is received, and now a queue corresponding to Cycle 6 is being scheduled, but because packet 2 is specified to enter Queue 0, as compared with Packet 1, Packet 2 incurs 1 cycle of schedule jitter; likewise, after another 150 us, when Packet 3 arrives, a queue at Cycle 5 is being scheduled just right, thereby incurring 2 cycles of jitter, . . . . As shown in FIG. 3, when Packets 1 to 8 arrive, from relationships between queues that are being scheduled and their corresponding cycle numbers, it can be known that there is a maximum of 7 cycles of jitter.

Therefore, although the method for specifying a packet from a specific user to enter a fixed queue is simple, when a cycle of a user sending a packet is not an integral multiple of a large circulation and has no common divisor with a schedule cycle, (d (a number/quantity of queues)−1) cycles of jitter are incurred. Therefore, even if CSQF can ensure 2 cycles of jitter end to end in a CSQF domain, jitter incurred by an end node cannot be ignored.

In addition, it is considered that, in actual scenes, within an edge node that receives a DT packet in a CSQF domain, there will be large latency jitter between components of receiving the packet and performing CSQF schedule forwarding (which may reach 20 us~50 us).

In some examples, analysis on intra-node latency jitter at a network node can be determined based on a model of forwarding a DT packet by an edge node in a CSQF domain.

This part will be illustrated below with reference to FIG. 11, and will not be repeated here.

Therefore, in order to solve a large jitter problem incurred by DT edge access, a DT packet received by an edge node in a CSQF domain will be no longer scheduled in a manner in which a DT from a specific user is forwarded at a specified cycle at a specific node, but a corresponding time slot number (which can be called a target time slot number) can be determined according to an arrival time of the DT packet, and a cycle schedule queue of the DT packet can be determined based on the time slot number.

In this embodiment, for how a network node determines a target time slot number corresponding to an arrival time of a packet, reference may be made to an implementation process illustrated in FIG. 4 below, which will not be repeated here.

In this embodiment, the case where a network node, serving as an edge node in a CSQF domain, receives a DT packet may include:

the network node, serving as an edge node that is connected to a non-DetNet domain in the CSQF domain, receives the DT packet; or the network node, serving as an edge node that is connected to a non-wide area DetNet (such as TSN) in a wide area DetNet, receives the DT packet; or the network node, serving as a forwarding relay node of CSQF on a super-long path in a wide area DetNet, receives the DT packet.

In a scene of CSQF on a super-long path, it is assumed that a number of hops corresponding to a number of labels supported by an edge node in a CSQF domain correspond to an intermediate node on a forwarding path. For a next-hop node of the intermediate node, lack of label information in a DT packet received by the next-hop node makes it impossible to determine a cycle schedule queue of the received DT packet according to the label information. In this case, the next-hop node can be called a forwarding relay node of CSQF on a super-long path in a wide area DetNet.

Likewise, a first forwarding node outside the coverage of a number of labels at a forwarding relay node of CSQF on a super-long path in a wide area DetNet can serve as a forwarding relay node of CSQF on a super-long path in a new wide area DetNet.

At step 102, according to the target time slot number, a time slot schedule cycle mapping table at an egress interface for the packet is queried, and a target cycle schedule queue corresponding to the target time slot number is determined.

In this embodiment, for an egress interface that supports CSQF, a time slot schedule cycle mapping table can be implemented in an input interface processing unit, and the time slot schedule cycle mapping table can be used to record a mapping relationship between a time slot number and a cycle schedule queue number, where in a process of establishing the mapping relationship between the time slot number and the cycle schedule queue number, intra-node jitter at a network node can be considered, so as to absorb the intra-node jitter at the network node during scheduling of a DT through the mapping relationship.

In this embodiment, for the establishment of the mapping relationship between the time slot number and the cycle schedule queue number, that is, a process of constructing the time slot schedule cycle mapping table, reference may be made to an implementation process illustrated in FIG. 5 below, which will not be repeated here.

In this embodiment, based on the target time slot number determined in step 101, the time slot schedule cycle mapping table at the egress interface for the packet is queried, a cycle schedule queue number mapped by the target time slot number is determined, and a cycle schedule queue identified by the cycle schedule queue number is determined as a cycle schedule queue (which can be called a target cycle schedule queue) corresponding to the target time slot number.

At step 103, the packet is scheduled to the target cycle schedule queue at the egress interface for the packet.

In this embodiment, in a case where the target cycle schedule queue is determined according to the method in steps 101 to 102, the packet can be scheduled to the target cycle schedule queue at the egress interface for the packet.

According to the method shown in FIG. 1, by determining a mapping relationship between a time slot number and a cycle schedule queue number based on intra-node jitter at a network node to construct a time slot schedule cycle mapping table, in a case where the network node determines that a received packet belongs to a DT and the packet does not carry CSQF domain schedule information, according to a target time slot number corresponding to an arrival time of the packet, a time slot schedule cycle mapping table at an egress interface for the packet is queried, and a target cycle schedule queue corresponding to the arrival time of the packet is determined, that is, a cycle schedule queue of the packet is determined according to the arrival time of the DT packet, and the DT packet is no longer scheduled in a manner in which a DT from a specific user is forwarded at a specified cycle at a specific node, so as to effectively absorb intra-node jitter during scheduling of a DT.

So far, the process shown in FIG. 1 is completed.

An implementation process of determining a target time slot number corresponding to an arrival time of a packet will be described below through a process shown in FIG. 4.

Figure 4:
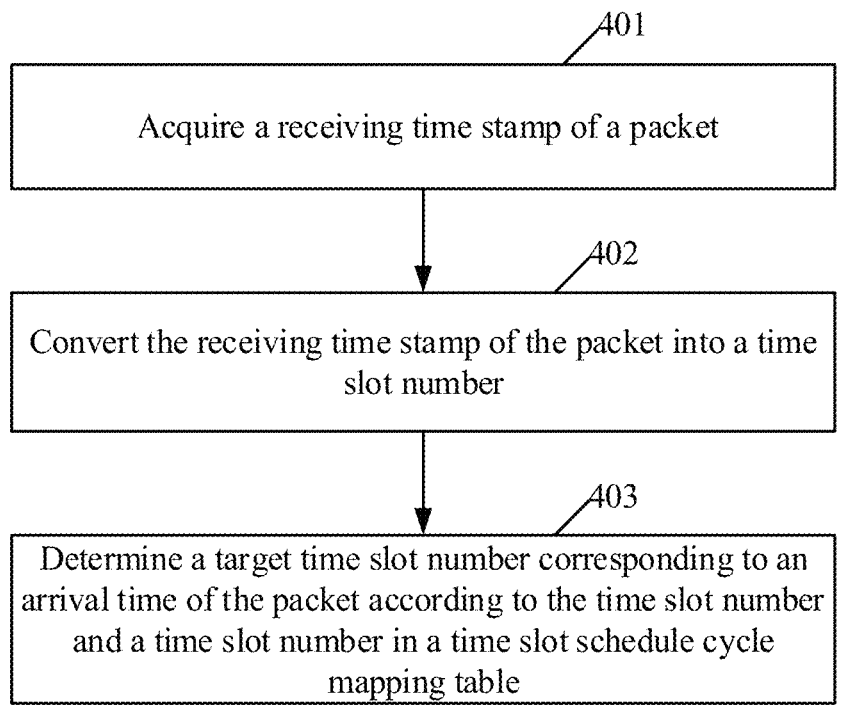
FIG. 4 is a schematic diagram illustrating an implementation process of determining a target time slot number corresponding to an arrival time of a packet according to an embodiment of the present disclosure.

FIG. 4 is a schematic diagram illustrating an implementation process of determining a target time slot number corresponding to an arrival time of a packet according to an embodiment of the present disclosure.

As shown in FIG. 4, the process may include the following steps:

At step 401, a receiving time stamp of a packet is acquired.

In this embodiment, a receiving time stamp of a packet can be a receiving time stamp put by hardware on the received packet. Some hardware does not support time stamping scenes. A system clock of a node can be obtained at a forwarding processing ingress as a receiving time stamp of a packet.

At step 402, the receiving time stamp of the packet is converted into a time slot number.

At step 403, a target time slot number corresponding to an arrival time of the packet is determined according to the time slot number and a time slot number in a time slot schedule cycle mapping table.

In some examples the time slot number obtained by converting the receiving time stamp of the packet can be divided by the time slot number in the time slot schedule cycle mapping table to take a reminder to obtain the target time slot number corresponding to the arrival time of the packet.

For example, assuming that the time slot number in the time slot schedule cycle mapping table is 256, and the time slot number obtained by converting the receiving time stamp of the packet is TimeSlotNum, then:

TimeSlotNum_Remainder=(TimeSlotNum&0xFF), or (TimeSlotNum %256), where TimeSlotNum_Remainder is the target time slot number corresponding to the arrival time of the packet.

In some examples, a time slot schedule cycle mapping table can be queried based on TimeSlotNum_Remainder as keywords to obtain a corresponding cycle schedule queue number. The cycle schedule queue number is a queue number of a cycle schedule queue that a packet is to enter at a network node.

So far, the process shown in FIG. 4 is completed.

An implementation process of determining a mapping relationship between a time slot number and a cycle schedule queue number will be described below through a process shown in FIG. 5.

In an embodiment, for an egress interface that supports CSQF, a mapping relationship between a time slot number recorded in a time slot schedule cycle mapping table at the egress interface and a cycle schedule queue number can be determined in the following manner:

for a time slot number, determining a cycle schedule queue number corresponding to the time slot number according to the time slot number, a schedule offset, and a number/quantity of cycle schedule queues at an egress interface, where the schedule offset is determined according to intra-node jitter at a network node.

In some examples, the time slot schedule cycle mapping table can be called a calendar schedule table.

In some examples, the calendar schedule table may include the following information and features:

1. time slot numbers (Calendar_Slot);
2. cycle schedule queue numbers mapped by the time slot numbers (Calendar_Que_No).

A number of time slots in the calendar schedule table is an integral multiple of a number/quantity of cycle schedule queues. For example, when the number/quantity of cycle schedule queues is 8, the number of time slots in the calendar schedule table is 8N (N is a positive integer). For example, the number of time slots in the calendar schedule table is 256.

Figure 5:
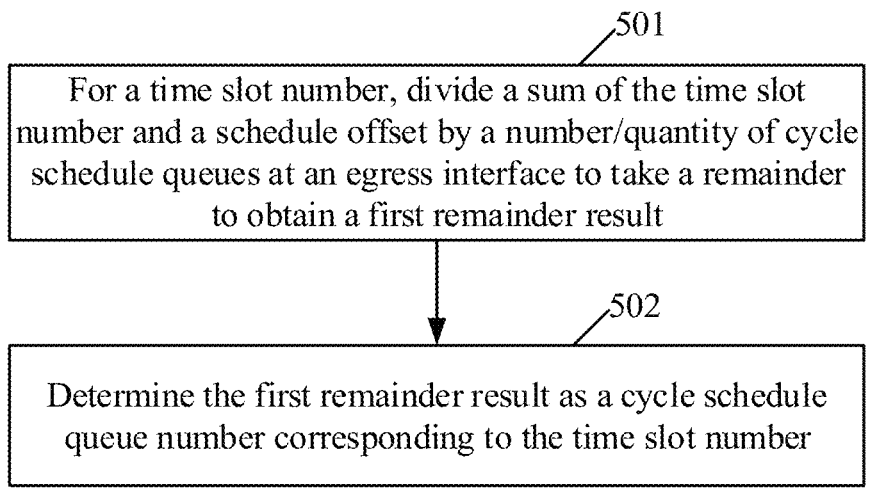
FIG. 5 is a schematic diagram illustrating an implementation process of determining a cycle schedule queue number corresponding to a time slot number according to an embodiment of the present disclosure.

FIG. 5 is a schematic diagram illustrating an implementation process of determining a cycle schedule queue number corresponding to a time slot number according to an embodiment of the present disclosure.

As shown in FIG. 5, the process may include:

At step 501, for a time slot number, a sum of the time slot number and a schedule offset is divided by a number/quantity of cycle schedule queues at an egress interface to take a remainder to obtain a first remainder result.

At step 502, the first remainder result is determined as a cycle schedule queue number corresponding to the time slot number.

In this embodiment, for a time slot number, a cycle schedule queue corresponding to the time slot number can be determined according to a sum of the time slot number and a schedule offset. Since the sum of the time slot number and the schedule offset may be greater than a number/quantity of cycle schedule queues, the sum of the time slot number and the schedule offset can be divided by the number/quantity of cycle schedule queues to take a remainder, and a remainder result (i.e., the first remainder result) is determined as a cycle schedule queue number corresponding to the time slot number.

In some examples, the cycle schedule queue number Calendar_Que_No corresponding to the time slot number may be determined in the following manner:

Calendar_Que_No = (Calendar_Slot + Schedule_Offset)% Que_Num, where Calendar_Slot is the time slot number, Schedule_Offset is the schedule offset, and Que_Num is the number/quantity of cycle schedule queues.

In this embodiment, the schedule offset can be used to characterize an offset between a cycle corresponding to a CSQF cycle schedule queue that a packet received by an input forwarding processing unit at time slot 0 enters at a node and a first cycle based on CSQF at the node. For a method of determining the schedule offset, reference may be made to an implementation process illustrated in FIG. 6 below, which will not be repeated here.

So far, the process shown in FIG. 5 is completed.

An implementation process of determining a schedule offset will be described below through a process shown in FIG. 6.

Figure 6:
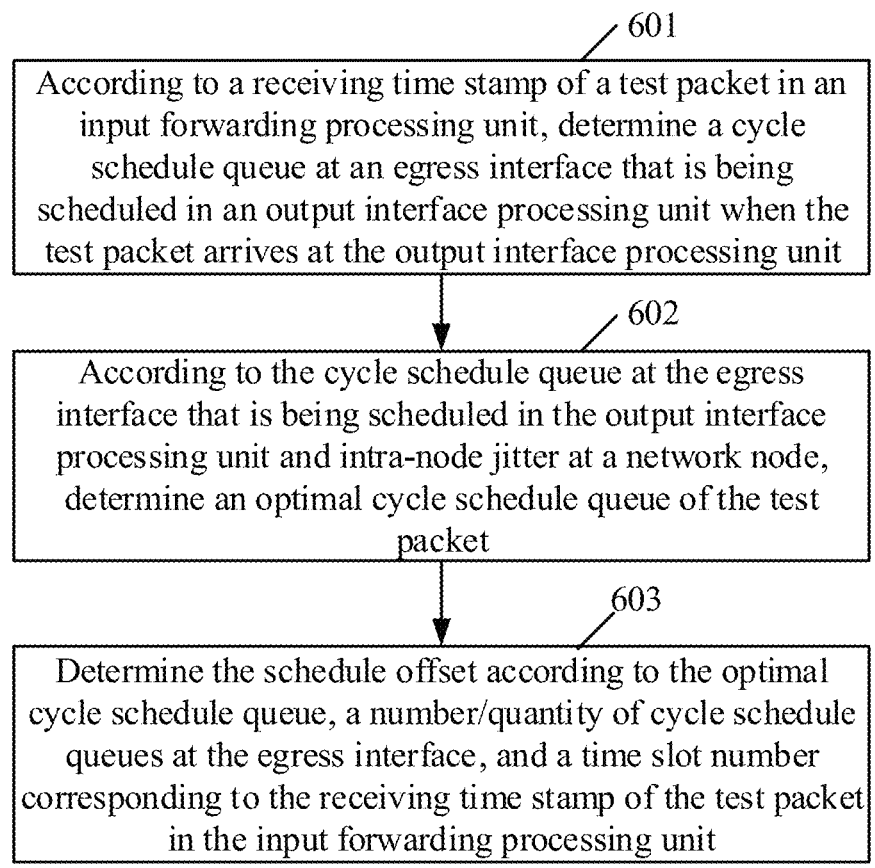
FIG. 6 is a schematic diagram illustrating an implementation process of determining a schedule offset according to an embodiment of the present disclosure.

FIG. 6 is a schematic diagram illustrating an implementation process of determining a schedule offset according to an embodiment of the present disclosure.

As shown in FIG. 6, for an egress interface that supports CSQF, the process of determining the schedule offset may include:

At step 601, according to a receiving time stamp of a test packet in an input forwarding processing unit, a cycle schedule queue at an egress interface that is being scheduled in an output interface processing unit when the test packet arrives at the output interface processing unit is determined.

In this embodiment, a cycle measurement and calibration method can be used to determine the cycle schedule queue at the egress interface that is being scheduled in the output interface processing unit when the test packet, after being sent from the input forwarding processing unit, arrives at the output interface processing unit.

At step 602, according to the cycle schedule queue at the egress interface that is being scheduled in the output interface processing unit and intra-node jitter at a network node, an optimal cycle schedule queue of the test packet is determined.

In this embodiment, in an ideal state, a next cycle schedule queue of the cycle schedule queue at the egress interface that is being scheduled in the output interface processing unit when the test packet arrives at the output interface processing unit, which is determined in step 601, is the most suitable cycle schedule queue for the test packet to enter.

However, since, in the process of sending the test packet from the input forwarding processing unit and scheduling the test packet to enter a queue in the output interface processing unit, there is certain latency jitter (that is, the intra-node jitter at the network node), a cycle schedule queue that the test packet is to enter can be shifted according to the latency jitter to obtain the optimal cycle schedule queue of the test packet.

For example, assuming that, when the test packet arrives at the output interface processing unit, the cycle schedule queue at the egress interface that is being scheduled in the output interface processing unit is Queue 2, the latency jitter is 30 us, and one time slot is 10 us, then a cycle schedule queue (Queue 6) obtained after a next cycle schedule queue (i.e., Queue 3) of Queue 2 is shifted by 3 queues can be determined as the optimal cycle schedule queue of the test packet.

At step 603, the schedule offset is determined according to the optimal cycle schedule queue, a number/quantity of cycle schedule queues at the egress interface, and a time slot number corresponding to the receiving time stamp of the test packet in the input forwarding processing unit.

In this embodiment, based on the above steps, an optimal cycle schedule queue corresponding to the time slot number corresponding to the receiving time stamp of the test packet in the input forwarding processing unit can be determined, that is, a corresponding relationship between the time slot number and the optimal cycle schedule queue can be obtained.

Since one time slot corresponds to one schedule cycle, based on the corresponding relationship and an offset between the time slot number and time slot 0, an optimal cycle schedule queue corresponding to time slot 0 can be determined. An optimal cycle schedule queue number can be used as the schedule offset.

In this embodiment, when the schedule offset is determined, the test packet can be constructed by CPU, and is transmitted to the input forwarding processing unit through an internal processing channel. The input forwarding processing unit can put the receiving time stamp for the test packet according to a system time of receiving the test packet, and determine, according to the receiving time stamp, the cycle schedule queue at the egress interface for the test packet that is being scheduled in the output interface processing unit when the test packet arrives at the output interface processing unit.

In some examples, the test packet can be constructed by the input forwarding processing unit. For example, the input forwarding processing unit can construct the test packet when receiving a test command. In this case, the input forwarding processing unit can put the receiving time stamp for the test packet according to a system time when the construction of the test packet is completed, and determine, according to the receiving time stamp, the cycle schedule queue at the egress interface for the test packet that is being scheduled in the output interface processing unit when the test packet arrives at the output interface processing unit.

It should be noted that, after the input forwarding processing unit receives the test packet, or completes the construction of the test packet, the test packet can be forwarded in a processing manner consistent with that after a DT packet arrives at an input forwarding processing unit at an edge node in a CSQF domain, so as to simulate the forwarding process of the DT packet at the edge node in the CSQF domain.

In addition, it is considered that, in the actual forwarding process of the DT packet, when the DT packet arrives at the edge node in the CSQF domain, an input interface processing unit puts the receiving time stamp for the packet, determines a corresponding time slot number (i.e., the target time slot number) according to the receiving time stamp, and maps a cycle schedule queue according to the above method. However, because latency of a packet arriving at the input forwarding processing unit through the input interface processing unit is usually small, and jitter is also smaller, the schedule offset obtained by testing according to the above method can more accurately absorb intra-node jitter.

In some examples, in order to further improve the accuracy of testing, for the receiving time stamp of the test packet, the test packet can be received in the input forwarding processing unit, or on the basis of the system time when the construction of the test packet is completed, a fixed time (corresponding to the latency of the packet arriving at the input forwarding processing unit through the input interface processing unit) is subtracted to obtain the receiving time stamp of the test packet.

In an example, determining the schedule offset according to the optimal cycle schedule queue, the number/quantity of cycle schedule queues at the egress interface, and the time slot number corresponding to the receiving time stamp of the test packet in the input forwarding processing unit includes:

dividing the time slot number corresponding to the receiving time stamp of the test packet in the input forwarding processing unit by the number/quantity of cycle schedule queues to take a remainder to obtain a second remainder result;
summing an optimal cycle schedule queue number and the number/quantity of cycle schedule queues at the egress interface to obtain a summation result;
dividing a difference between the summation result and the second remainder result by the number/quantity of cycle schedule queues at the egress interface to take a remainder to obtain a third remainder result; and
determining the third remainder result as the schedule offset.

In some examples, since the time slot number corresponding to the receiving time stamp of the test packet in the input forwarding processing unit is a time slot difference between the time slot number corresponding to the receiving time stamp of the test packet in the input forwarding processing unit and time slot 0, the time slot difference should be consistent with a difference between the optimal cycle schedule queue number of the test packet and the optimal cycle schedule queue number corresponding to time slot 0.

For example, assuming that the receiving time stamp of the test packet in the input forwarding processing unit corresponds to time slot n, and the optimal cycle schedule queue number of the test packet is RQ, then the optimal cycle schedule queue number corresponding to time slot 0 should be a cycle schedule queue number obtained after cycle schedule queue RQ is returned by n cycles.

Considering that n may be greater than a number of cycles, n can be divided by the number/quantity of cycle schedule queues at the egress interface to take a remainder to obtain a remainder result (i.e., the second remainder result), and optimal cycle schedule queue RQ of the test packet is returned by the second remainder result of cycles.

Further considering that RQ may be smaller than the second remainder result, when RQ is returned, the number/quantity of cycle schedule queues at the egress interface can be added first, then RQ is returned by the second remainder result of cycles, and an obtained cycle schedule queue number is divided by the number/quantity of cycle schedule queues at the egress interface to take a remainder to obtain a remainder result (i.e., the third remainder result), which is the schedule offset.

In some examples, the schedule offset Schedule_Offset can be determined according to the following strategy:

$$\text{Schedule\_Offset} = (RQ + \text{Que\_Num} - (n\,\%\,\text{Que\_Num}))\,\%\,\text{Que\_Num}.$$

For example, assuming that, when the receiving time stamp of the test packet in the input forwarding processing unit is xxx433 us, and the test packet arrives at the output interface processing unit, the cycle schedule queue at the egress interface for the test packet that is being scheduled in the output interface processing unit is Queue 2, then queue 3 is theoretically the most suitable queue for the test packet to enter. However, since, in the process of sending the test packet from the input forwarding processing unit and scheduling the test packet to enter a queue in the output interface processing unit, there is certain latency jitter, which is assumed to be 30 us (assuming that one time slot is 10 us), the optimal cycle schedule queue of the test packet is a queue obtained after Queue 2 is shifted by 30 us (i.e., 3 cycles), that is, Queue 6 (i.e., RQ=6).

Based on this, it can be known that time slot number 43 corresponding to a sending time stamp of the test packet is mapped to cycle schedule queue 6. Since a time slot difference between time slot number 43 and time slot 0 is 43, the optimal cycle schedule queue number corresponding to time slot 0, that is, a value of Schedule_Offset, can be calculated according to the following strategy (assuming that a number/quantity of cycle schedule queues at the egress interface for the test packet is 15):

$$\text{Schedule\_Offset} =$$
$$(RQ + \text{Que\_Num} - (n \% \text{Que\_Num})) \% \text{Que\_Num} = (6 + 15 - (43\%15))\%15 = 8.$$

So far, the process shown in FIG. 6 is completed.

Further, it is considered that, when there are multiple DTs to access, multiple flows may arrive at the same time slot, which will cause the situation of traffic conflict.

Due to the traffic conflict, some DTs may not be arranged to the closest time slot, and is to be adjusted to adjacent schedule time slots (as long as jitter requirements are met). Therefore, a time slot update table is required to adjust a time slot number corresponding to an arrival time of each DT.

Figure 7:
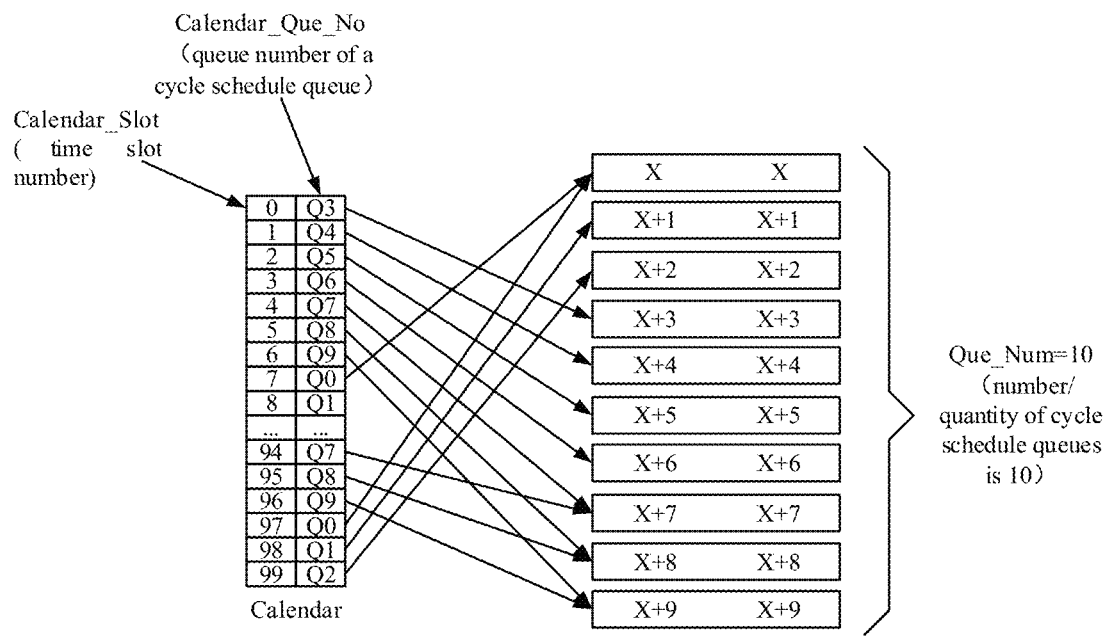
FIG. 7 is a schematic diagram illustrating a calendar schedule table.
Figure 8:
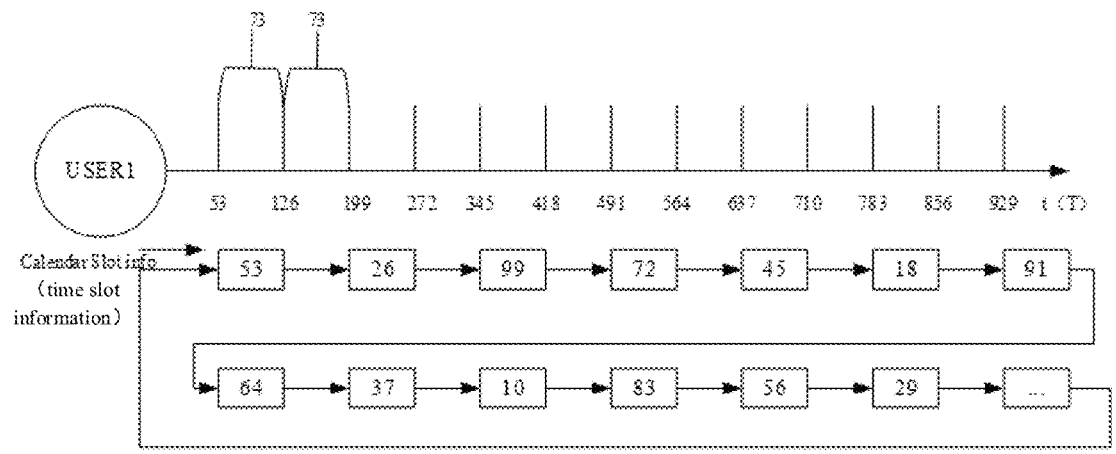
FIG. 8 is a schematic diagram illustrating packets sending time slot distribution for a DT.

Referring to FIG. 7 and FIG. 8, it is assumed that the number/quantity of cycle schedule queues is 10, and the number of time slots in a time slot schedule cycle table (taking Calendar as an example) is 100. In FIG. 8, a cycle of User 1 sending a packet is 730 us (that is, 73 schedule cycles), where a time slot number corresponding to an arrival time of a first packet from the user is 53, and a time slot number corresponding to an arrival time of a second packet from the user is 26.

Figure 9:
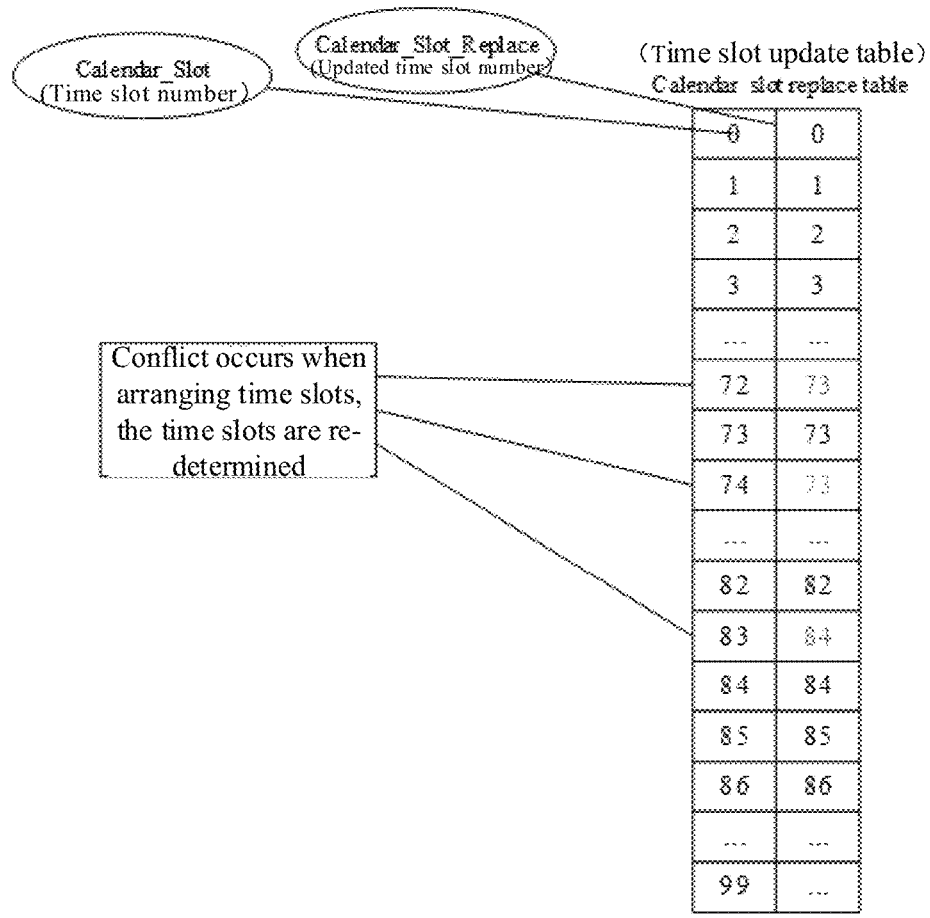
FIG. 9 is a schematic diagram illustrating a time slot update table.

Assuming that there is traffic conflict between time slots 72 and 74 at an egress interface for a data flow, but time slot 73 is less used (which can be determined by a controller or be artificially monitored), then a time slot table in FIG. 9 can be updated, and time slot numbers of packets with time slot numbers 72 and 74 corresponding to an arrival time are updated to 73, that is, the packets are scheduled to a cycle schedule queue corresponding to time slot 73.

It is assumed that, as shown in FIG. 8, 10 CSQF cycle queues and a calendar with 100 time slots are implemented. Taking a data flow from USER 1 in FIG. 13 as an example, a cycle interval is 73 time slots (730 us), and a first packet from the user is at time slot 53, a second packet is at time slot 26, . . . . Assuming that there is conflict between time slots 72 and 74 at the same interface of CSQF, but time slot 73 is less used (or even not used), then a time slot update table as shown in FIG. 9 is designed. Packets that should be at time slots 72 and 74 are scheduled to a forwarding queue corresponding to time slot 73.

As shown in FIG. 9, Calendar_Slot is a time slot number calculated according to a receiving time stamp of a packet, and Calendar_Slot_Replace is an updated time slot number.

Considering that, for an edge node that is connected to a non-DetNet domain in a CSQF domain, before a DT arrives at the node, there may be situations where the non-DetNet domain is to be crossed, which results in that there will be some jitter at a time slot of the same DT arriving at the node. In order to eliminate the jitter and implement the shaping of the input DT, for the same DT packet, when time slot numbers corresponding to an arrival time of the packet arriving at the node are several adjacent time slot numbers, the time slot numbers can be updated and mapped to the same time slot number.

For example, for a DT, when time slot numbers corresponding to an arrival time of the DT include 0, 1 and 2, the time slot numbers can be mapped to time slot number 2, so as to implement the shaping of the DT.

Figure 10:
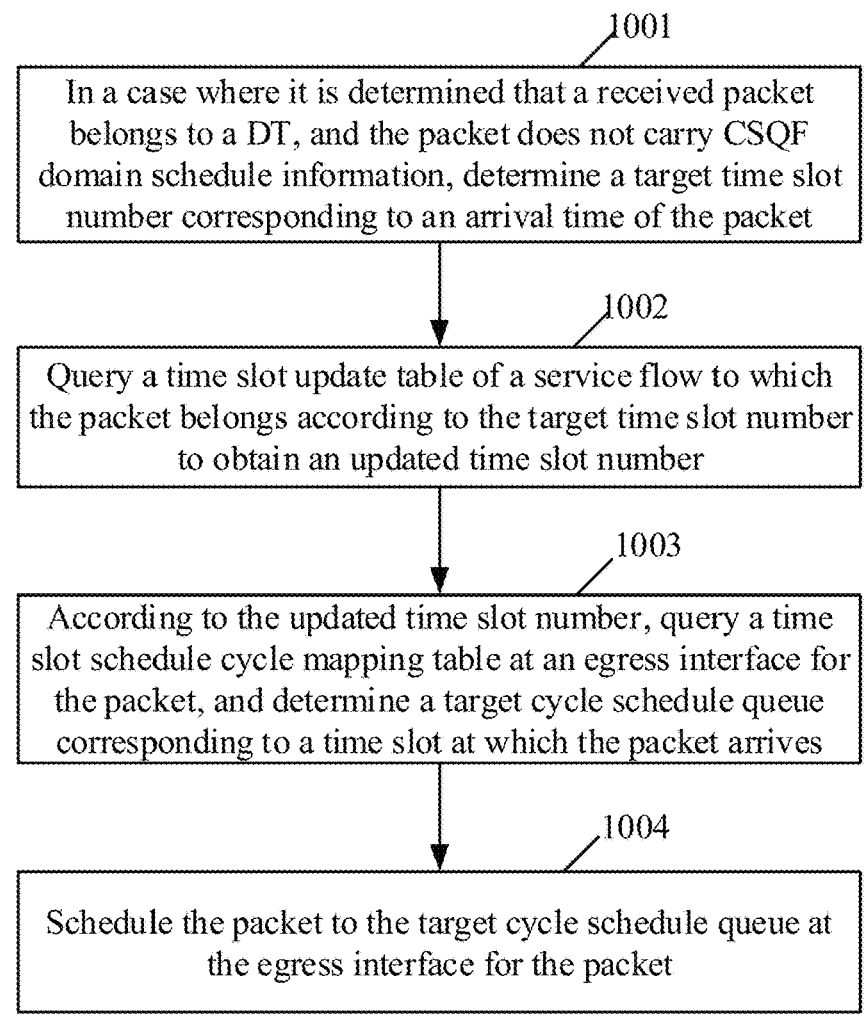
FIG. 10 is a flowchart illustrating a DT transmission method according to an embodiment of the present disclosure.

Correspondingly, referring to FIG. 10, the process of a DT transmission method may be as shown in FIG. 10.

As shown in FIG. 10, the process may include the following steps:

At step 1001, in a case where it is determined that a received packet belongs to a DT, and the packet does not carry CSQF domain schedule information, a target time slot number corresponding to an arrival time of the packet is determined.

At step 1002, a time slot update table of a service flow to which the packet belongs is queried according to the target time slot number to obtain an updated time slot number.

At step 1003, according to the updated time slot number, a time slot schedule cycle mapping table at an egress interface for the packet is queried, and a target cycle schedule queue corresponding to a time slot at which the packet arrives is determined.

At step 1004, the packet is scheduled to the target cycle schedule queue at the egress interface for the packet.

By generating the time slot update table, the conflict problem between DT schedule time slots at an edge node in a CSQF domain is effectively solved, the adaptability of CSQF is enhanced, and the DT carrying capacity on the same path can be improved. In addition, according to the time slot update table, the shaping of a DT can be implemented.

It should be noted that, since, for an edge node that is connected to a non-wide area DetNet (such as TSN) in a wide area DetNet, or a forwarding relay node of CSQF on a super-long path in a wide area DetNet, DTs received thereby are from a deterministic domain. There is usually no need to shape the DTs. There will not be a situation where some time slots are less used, and some time slots are more used. In addition, for the edge node that is connected to the non-wide area DetNet (such as TSN) in the wide area DetNet, or the forwarding relay node of CSQF on the super-long path in the wide area DetNet, a number/quantity of DTs that is to be processed thereby is usually larger. If the time slot update table is configured and delivered for each DT, huge resources will be consumed. Therefore, in practical applications, for the edge node that is connected to the non-wide area DetNet (such as TSN) in the wide area DetNet, or the forwarding relay node of CSQF on the super-long path in the wide area DetNet, the time slot update table may not be configured and delivered.

In some examples, at an edge node that is connected to a non-DetNet domain in a CSQF domain, a time slot update table can be delivered for each DT.

A model of forwarding a DT packet by an edge node in a CSQF domain will be described below with reference to FIG. 11.

Figure 11:
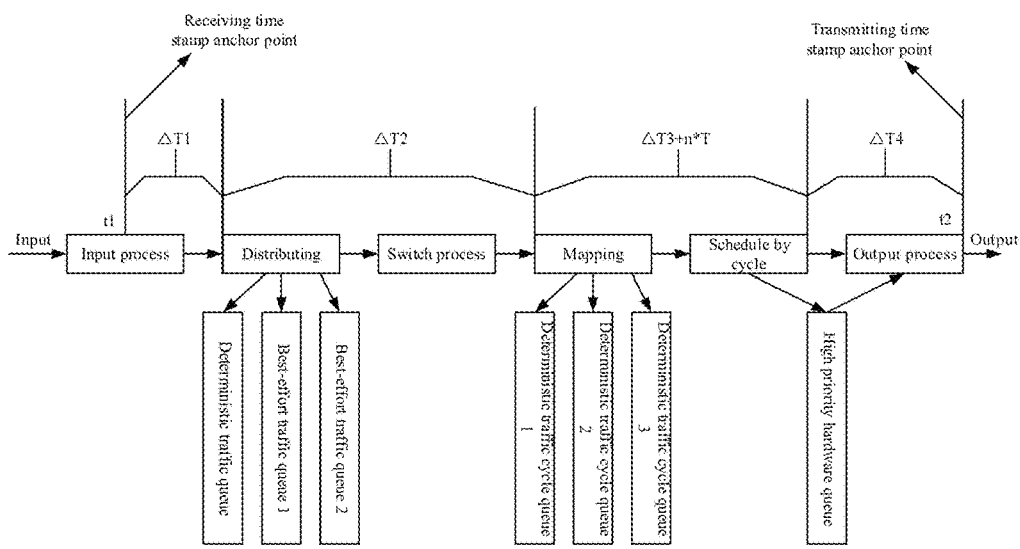
FIG. 11 is a schematic diagram illustrating intra-node latency decomposition of a model of forwarding a DT packet by an edge node in a CSQF domain according to an embodiment of the present disclosure.

FIG. 11 is a schematic diagram illustrating intra-node latency decomposition of a model of forwarding a DT packet by an edge node in a CSQF domain according to an embodiment of the present disclosure.

As shown in FIG. 11, the process of forwarding a DT packet by an edge node in a CSQF domain includes:

an input process, a distributing process, a switch process, a mapping process, a schedule by cycle process, and an output process.

Input Process: used for anchoring input time stamps.

In some examples, the input process is mainly a function of a hardware controller for implementing the anchoring of input time stamps.

Distributing Process: used for cache distribution.

In some examples, the distributing process may be implemented by a hardware controller, or by software.

Switch Process: used for intra-node forwarding related processing.

In some examples, the switch process may include software processing, and microcodes from an NP cooperate with a hardware unit to implement a pipeline. For a distributed device, it may further include the switch processing of input interface board→network board→output interface board. For specific implementation, reference may be made to an implementation process illustrated in FIG. 12 below, which will not be repeated here.

Mapping Process: used for mapping DT packets to cycle schedule queues according to cycles.

In some examples, software (or microcodes from NP) or Field Programmable Gate Array (FPGA) is to participate in the mapping process, and programmability is required to provide implementation flexibility.

Schedule by Cycle Process: used for scheduling cycle schedule queues according to schedule cycles, and sending data in sending cycle queues to hardware queues configured with a reserved highest priority.

Output Process: used for hardware sending processing.

In some examples, in the output process, hardware queues configured with a reserved highest priority can be used as hardware queues for sending DTs, and output time stamps are put.

In multi-stage latency decomposition shown in FIG. 11, processing latency in the switch process is indeterminate, involving intra-node queuing, and there may be a difference of up to 20 us-50 us.

A switch process of a distributed device is taken as an example.

Figure 12:
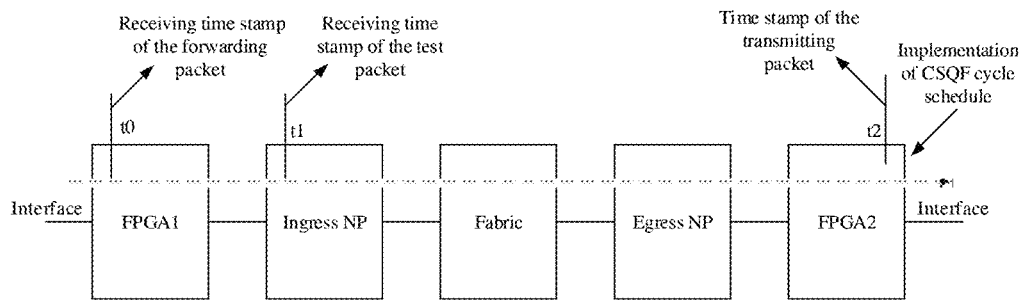
FIG. 12 is a schematic diagram illustrating a forwarding model in a switch process of a distributed device according to an embodiment of the present disclosure.

FIG. 12 is a schematic diagram illustrating a forwarding model in a switch process of a distributed device according to an embodiment of the present disclosure. As shown in FIG. 12, processing latency in the switch process may include processing latency in an input forwarding processing unit (for example, an Ingress NP in FIG. 12), an internal switch unit (for example, Fabric in FIG. 12), and an output forwarding processing unit (for example, an Egress NP in FIG. 12), and superimposed jitter there-among may reach more than 20 us.

During the implementation shown in FIG. 12, both the two stages of Mapping and Schedule by Cycle are implemented by an output interface processing unit (for example, FPGA2 in FIG. 12), and there is larger indeterminate latency jitter (i.e., intra-node jitter) in the mapping process of a packet entering from an input interface processing unit (for example, FPGA1 in FIG. 12) to the output interface processing unit.

In some examples, FPGA1 and FPGA2 may be different FPGAs, or the same FPGA (for example, scenes of traffic loopback or scenes where the same FPGA implements multiple external ports).

In order to eliminate intra-node jitter, a schedule offset can be determined by testing in the above-described manners.

Taking the implementation shown in FIG. 12 as an example, when a schedule offset is determined, according to a receiving time stamp of a test packet in an Ingress NP, a cycle schedule queue at an egress interface for the test packet that is being scheduled in FPGA2 when the test packet arrives at FPGA2 can be determined; according to the cycle schedule queue and intra-node latency, such as 30 us, an optimal cycle schedule queue of the test packet is determined; according to an optimal cycle schedule queue number, and a time slot number corresponding to the receiving time stamp of the test packet in the Ingress NP, the schedule offset is determined in the above-described manners.

So far, the description of the method according to the embodiments of the present disclosure is completed. An electronic device according to the embodiments of the present disclosure will be described below.

Figure 13:
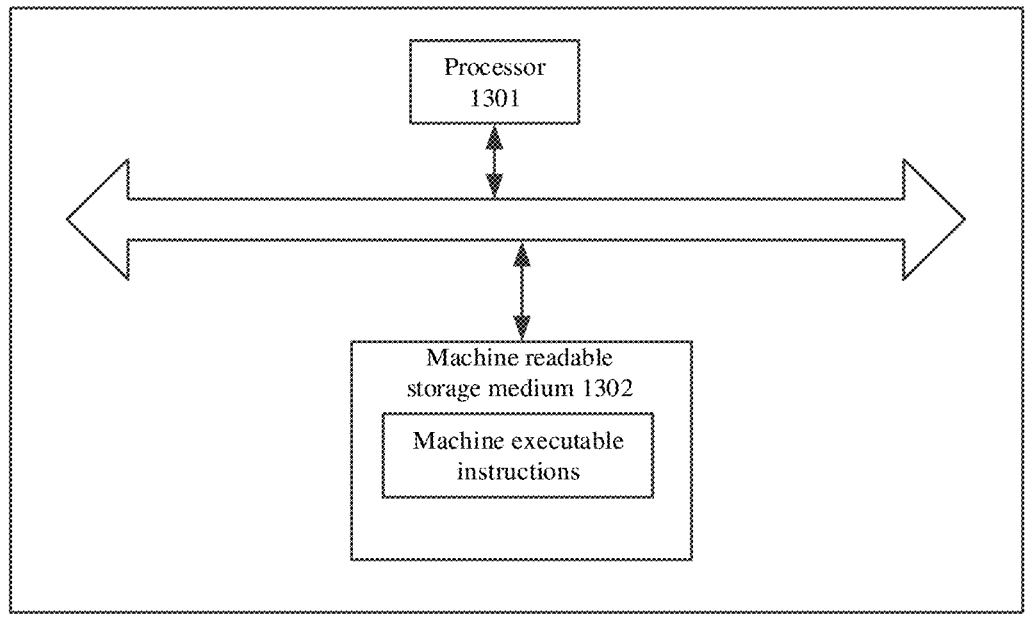
FIG. 13 is a schematic diagram illustrating a hardware structure of an electronic device according to an embodiment of the present disclosure.

FIG. 13 is a schematic diagram illustrating a hardware structure of an electronic device according to an embodiment of the present disclosure. As shown in FIG. 13, the electronic device includes a processor 1301 and a machine readable storage medium 1302, where machine executable instructions that can be executed by the processor are stored in the machine readable storage medium; and the processor is configured to execute the machine executable instructions to implement the methods disclosed in the embodiments of the present disclosure.

Specifically, the processor executes the machine executable instructions to: in a case where it is determined that a received packet belongs to a DT, and the packet does not carry CSQF domain schedule information, determine a target time slot number corresponding to an arrival time of the packet; according to the target time slot number, query a time slot schedule cycle mapping table at an egress interface for the packet, and determine a target cycle schedule queue corresponding to the target time slot number, where the time slot schedule cycle mapping table is determined based on intra-node jitter at the network node, and is used to record a mapping relationship between a time slot number and a cycle schedule queue number; schedule the packet to the target cycle schedule queue at the egress interface for the packet.

In an example, the processor executes the machine executable instructions to: acquire a receiving time stamp of the packet; convert the receiving time stamp of the packet into a time slot number; determine the target time slot number corresponding to the arrival time of the packet according to the time slot number and a time slot number in the time slot schedule cycle mapping table.

In an example, the processor executes the machine executable instructions to: for an egress interface that supports CSQF, determine the mapping relationship between the time slot number and the cycle schedule queue number recorded in the time slot schedule cycle mapping table at the egress interface in the following manners: for a time slot number, determining a cycle schedule queue number corresponding to the time slot number according to the time slot number, a schedule offset, and a number/quantity of cycle schedule queues at the egress interface, where the schedule offset is determined according to the intra-node jitter at the network node.

In an example, the processor executes the machine executable instructions to: divide a sum of the time slot number and the schedule offset by the number/quantity of cycle schedule queues at the egress interface to take a remainder to obtain a first remainder result; determine the first remainder result as the cycle schedule queue number corresponding to the time slot number.

In an example, the processor executes the machine executable instructions to: determine the schedule offset in the following manners: according to a receiving time stamp of a test packet in an input forwarding processing unit, determining a cycle schedule queue at the egress interface that is being scheduled in an output interface processing unit when the test packet arrives at the output interface processing unit; according to the cycle schedule queue at the egress interface that is being scheduled in the output interface processing unit and the intra-node jitter at the network node, determining an optimal cycle schedule queue of the test packet; determining the schedule offset according to the optimal cycle schedule queue, the number/quantity of cycle schedule queues at the egress interface, and a time slot number corresponding to the receiving time stamp of the test packet in the input forwarding processing unit.

In an example, the processor executes the machine executable instructions to: divide the time slot number corresponding to the receiving time stamp of the test packet in the input forwarding processing unit by the number/quantity of cycle schedule queues to take a remainder to obtain a second remainder result; sum an optimal cycle schedule queue number and the number/quantity of cycle schedule queues at the egress interface to obtain a summation result; divide a difference between the summation result and the second remainder result by the number/quantity of cycle schedule queues at the egress interface to take a remainder to obtain a third remainder result; determine the third remainder result as the schedule offset.

In an example, the processor executes the machine executable instructions to: query a time slot update table of a service flow to which the packet belongs according to the target time slot number to obtain an updated time slot number; according to the updated time slot number, query the time slot schedule cycle mapping table at the egress interface for the packet, and determine a target cycle schedule queue corresponding to a time slot at which the packet arrives.

In an example, a process of forwarding a DT packet by an edge node in a CSQF domain includes:
an input process, a distributing process, a switch process, a mapping process, a schedule by cycle process, and an output process, where
the input process is used for anchoring input time stamps;
the distributing process is used for cache distribution;
the switch process is used for intra-node forwarding related processing;
the mapping process is used for mapping DT packets to cycle schedule queues according to cycles;
the schedule by cycle process is used for scheduling cycle schedule queues according to schedule cycles, and sending data in sending cycle queues to hardware queues configured with a reserved highest priority;
the output process is used for hardware sending processing.

In an example, the intra-node jitter at the network node includes processing latency jitter in the switch process.

As can be known from the above technical solutions, in the embodiments, by determining a mapping relationship between a time slot number and a cycle schedule queue number based on intra-node jitter at a network node to construct a time slot schedule cycle mapping table, intra-node jitter during scheduling of a DT is effectively absorbed.

Based on the same application concepts as the above method, in an embodiment of the present disclosure, there is provided a non-transitory machine readable storage medium storing computer executable instructions, such as the machine readable storage medium in FIG. 13, where the computer executable instructions can be executed by a processor 801 in the electronic device shown in FIG. 13 to implement the method for analyzing data flows as described above.

In some examples, the machine readable storage medium may be any electronic, magnetic, optical, or other physical storage apparatus, and may contain or store information, such as executable instructions, and data. For example, the machine readable storage medium may be: a Radom Access Memory (RAM for short), a volatile memory, a non-volatile memory, a flash memory, a storage drive (such as hard drive), a solid state hard disk, any type of storage disk (such as optical discs, and Digital Video Disks (DVDs for short)), or similar storage medium, or a combination of them.

The system, apparatus, module or unit set forth in the above examples may be specifically implemented by a computer chip or an entity, or implemented by a product having a certain function. A typical implementation device is a computer, and a specific form of the computer may be a personal computer, a laptop computer, a cellular phone, a camera phone, a smart phone, a personal digital assistant, a media player, a navigation device, an e-mail transceiver device, a game console, a tablet computer, a wearable device, or a combination of any of these devices.

For the convenience of description, during the description of the apparatus, it is divided into various units according to their functions, which are described respectively. Of course, when the present disclosure is implemented, functions of each unit may be realized in one or more software and/or hardware.

Those skilled in the art should understand that the embodiments of the present disclosure may be provided as methods, systems, or computer program products. Accordingly, the present disclosure may take the form of a pure hardware embodiment, a pure software embodiment, or an embodiment combining software and hardware aspects. Furthermore, the embodiments of the present disclosure may take the form of a computer program product implemented on one or more computer usable storage media (including, but not limited to, disk storage, Compact Disc Read-Only Memory (CD-ROM for short), optical storage, etc.) having computer usable program codes therein.

The present disclosure is described with reference to flowcharts and/or block diagrams illustrating methods, apparatuses (or systems), and computer program products according to the embodiments of the present disclosure. It should be understood that each process and/or block, and combinations of processes and/or blocks in the flowcharts and/or block diagrams can be implemented by computer program instructions. These computer program instructions may be provided to a processor of a general-purpose computer, a special-purpose computer, an embedded processing machine or other programmable data processing device to produce a machine, so that the instructions executed by the processor of the computer or other programmable data processing device produce an apparatus for realizing functions specified in one or more processes in a flowchart and/or one or more blocks in a block diagram.

Furthermore, these computer program instructions may be stored in a computer readable memory capable of directing a computer or other programmable data processing device to operate in a particular manner, so that the instructions stored in the computer readable memory produce a product including an instruction device. The instruction device can realize functions specified in one or more processes in a flowchart and/or one or more blocks in a block diagram.

These computer program instructions may be loaded on a computer or other programmable data processing device, so that a series of operation steps are performed on the computer or other programmable device to produce processes implemented by a computer, and the instructions executed on the computer or other programmable device provide steps for realizing functions specified in one or more processes in a flowchart and/or one or more blocks in a block diagram.

The above are only embodiments of the present disclosure, which are not intended to limit the present disclosure. For those skilled in the art, various modifications and variations can be made to the application. Any modification, equivalent replacement, improvement, etc. made within the spirit and principle of the present disclosure shall fall into the scope of the claims of the present disclosure.

The invention claimed is:

1. A Deterministic Traffic (DT) transmission method, applied to a network node, and comprising:
in response to a received packet belonging to a DT, and the packet does not carry Cycle Specified Queuing and Forwarding (CSQF) domain schedule information, determining a target time slot number corresponding to an arrival time of the packet;
according to the target time slot number, querying a time slot schedule cycle mapping table of an egress interface for the packet, and determining a target cycle schedule queue corresponding to the target time slot number, wherein the time slot schedule cycle mapping table is determined based on intra-node jitter at the network node, and the time slot schedule cycle mapping table is used to record a mapping relationship between a first time slot number and a cycle schedule queue number; and
scheduling the packet to the target cycle schedule queue at the egress interface for the packet;
wherein the egress interface supports CSQF, the mapping relationship is determined in the following manners:
determining a cycle schedule queue number corresponding to the first time slot number according to the first time slot number, a schedule offset, and a number of cycle schedule queues at the egress interface, comprising:
dividing a sum of the first time slot number and the schedule offset by the number of cycle schedule queues at the egress interface to take a remainder to obtain a first remainder result; and
determining the first remainder result as the cycle schedule queue number corresponding to the first time slot number;
wherein the schedule offset is determined according to the intra-node jitter at the network node.

2. The method according to claim 1, wherein determining the target time slot number corresponding to the arrival time of the packet comprises:
acquiring a receiving time stamp of the packet;
converting the receiving time stamp of the packet into a second time slot number; and
determining the target time slot number corresponding to the arrival time of the packet according to the second time slot number and the first time slot number in the time slot schedule cycle mapping table.

3. The method according to claim 1, wherein the schedule offset is determined in the following manners:
according to a receiving time stamp of a test packet in an input forwarding processing unit, determining a cycle schedule queue at the egress interface being scheduled in an output interface processing unit when the test packet arrives at the output interface processing unit;
according to the cycle schedule queue at the egress interface being scheduled in the output interface processing unit and the intra-node jitter at the network node, determining an optimal cycle schedule queue of the test packet; and
determining the schedule offset according to the optimal cycle schedule queue, the number of cycle schedule queues at the egress interface, and a third time slot number corresponding to the receiving time stamp of the test packet in the input forwarding processing unit.

4. The method according to claim 3, wherein determining the schedule offset according to the optimal cycle schedule queue, the number of cycle schedule queues at the egress interface, and the third time slot number corresponding to the receiving time stamp of the test packet in the input forwarding processing unit comprises:
dividing the third time slot number corresponding to the receiving time stamp of the test packet in the input forwarding processing unit by the number of cycle schedule queues to take a remainder to obtain a second remainder result;
summing an optimal cycle schedule queue number and the number of cycle schedule queues at the egress interface to obtain a summation result;
dividing a difference between the summation result and the second remainder result by the number of cycle schedule queues at the egress interface to take a remainder to obtain a third remainder result; and
determining the third remainder result as the schedule offset.

5. The method according to claim 1, wherein after determining the target time slot number corresponding to the arrival time of the packet, the method further comprises:
querying a time slot update table of a service flow to which the packet belongs according to the target time slot number to obtain an updated time slot number; and
according to the target time slot number, querying the time slot schedule cycle mapping table of the egress interface for the packet, and determining the target cycle schedule queue corresponding to the target time slot number comprises:
according to the updated time slot number, querying the time slot schedule cycle mapping table of the egress interface for the packet, and determining a target cycle schedule queue corresponding to a time slot at which the packet arrives.

6. The method according to claim 1, wherein a process of forwarding a DT packet by an edge node in a CSQF domain comprises:
an input process, a distributing process, a switch process, a mapping process, a schedule by cycle process, and an output process; wherein:
the input process is used for anchoring input time stamps;
the distributing process is used for cache distribution;
the switch process is used for intra-node forwarding related processing;
the mapping process is used for mapping DT packets to cycle schedule queues according to cycles;
the schedule by cycle process is used for scheduling cycle schedule queues according to schedule cycles, and sending data in sending cycle queues to hardware queues, wherein the hardware queues are configured with a reserved highest priority; and the output process is used for sending the DT packet by taking the hardware queues configured with the reserved highest priority as hardware queues for sending the DT packet.

7. The method according to claim 6, wherein the intra-node jitter at the network node comprises processing latency jitter in the switch process.

8. A non-transitory machine readable storage medium, wherein instructions are stored in the non-transitory machine readable storage medium, and the instructions cause a processor to implement the method according to claim 1.

9. An electronic device, comprising: a processor and a machine readable storage medium, wherein machine executable instructions executed by the processor are stored in the machine readable storage medium; and the processor is configured to execute the machine executable instructions to implement the operations comprising:

in response to a received packet belonging to a deterministic traffic (DT), and the packet does not carry Cycle Specified Queuing and Forwarding (CSQF) domain schedule information, determining a target time slot number corresponding to an arrival time of the packet;

according to the target time slot number, querying a time slot schedule cycle mapping table of an egress interface for the packet, and determining a target cycle schedule queue corresponding to the target time slot number, wherein the time slot schedule cycle mapping table is determined based on intra-node jitter at a network node, and the time slot schedule cycle mapping table is used to record a mapping relationship between a first time slot number and a cycle schedule queue number; and scheduling the packet to the target cycle schedule queue at the egress interface for the packet;

wherein the egress interface supports CSQF, the mapping relationship is determined in the following manners:

determining a cycle schedule queue number corresponding to the first time slot number according to the first time slot number, a schedule offset, and a number of cycle schedule queues at the egress interface, comprising:

dividing a sum of the first time slot number and the schedule offset by the number of cycle schedule queues at the egress interface to take a remainder to obtain a first remainder result; and determining the first remainder result as the cycle schedule queue number corresponding to the first time slot number;

wherein the schedule offset is determined according to the intra-node jitter at the network node.

10. The electronic device according to claim 9, wherein determining the target time slot number corresponding to the arrival time of the packet comprises:

acquiring a receiving time stamp of the packet;

converting the receiving time stamp of the packet into a second time slot number; and determining the target time slot number corresponding to the arrival time of the packet according to the second time slot number and the first time slot number in the time slot schedule cycle mapping table.

11. The electronic device according to claim 9, wherein the schedule offset is determined in the following manners:

according to a receiving time stamp of a test packet in an input forwarding processing unit, determining a cycle schedule queue at the egress interface being scheduled in an output interface processing unit when the test packet arrives at the output interface processing unit;

according to the cycle schedule queue at the egress interface being scheduled in the output interface processing unit and the intra-node jitter at the network node, determining an optimal cycle schedule queue of the test packet; and determining the schedule offset according to the optimal cycle schedule queue, the number of cycle schedule queues at the egress interface, and a third time slot number corresponding to the receiving time stamp of the test packet in the input forwarding processing unit.

12. The electronic device according to claim 11, wherein determining the schedule offset according to the optimal cycle schedule queue, the number of cycle schedule queues at the egress interface, and the third time slot number corresponding to the receiving time stamp of the test packet in the input forwarding processing unit comprises:

dividing the third time slot number corresponding to the receiving time stamp of the test packet in the input forwarding processing unit by the number of cycle schedule queues to take a remainder to obtain a second remainder result;

summing an optimal cycle schedule queue number and the number of cycle schedule queues at the egress interface to obtain a summation result;

dividing a difference between the summation result and the second remainder result by the number of cycle schedule queues at the egress interface to take a remainder to obtain a third remainder result; and determining the third remainder result as the schedule offset.

13. The electronic device according to claim 9, wherein after determining the target time slot number corresponding to the arrival time of the packet, the method further comprises:

querying a time slot update table of a service flow to which the packet belongs according to the target time slot number to obtain an updated time slot number;

according to the target time slot number, querying the time slot schedule cycle mapping table of the egress interface for the packet, and determining the target cycle schedule queue corresponding to the target time slot number comprises:

according to the updated time slot number, querying the time slot schedule cycle mapping table of the egress interface for the packet, and determining a target cycle schedule queue corresponding to a time slot at which the packet arrives.

14. The electronic device according to claim 9, wherein a process of forwarding a DT packet by an edge node in a CSQF domain comprises:

an input process, a distributing process, a switch process, a mapping process, a schedule by cycle process, and an output process, wherein;

the input process is used for anchoring input time stamps;

the distributing process is used for cache distribution;

the switch process is used for intra-node forwarding related processing;

the mapping process is used for mapping DT packets to cycle schedule queues according to cycles;

the schedule by cycle process is used for scheduling cycle schedule queues according to schedule cycles, and sending data in sending cycle queues to hardware queues, wherein the hardware queues are configured with a reserved highest priority;

the output process is used for sending the DT packet by taking the hardware queues configured with the reserved highest priority as hardware queues for sending the DT packet.

15. The electronic device according to claim 14, wherein the intra-node jitter at the network node comprises processing latency jitter in the switch process.

* * * * *